Nov. 11, 1941.   C. I. MacNEIL   2,262,331
FLUID PRESSURE SYSTEM
Filed Dec. 5, 1940   2 Sheets-Sheet 2
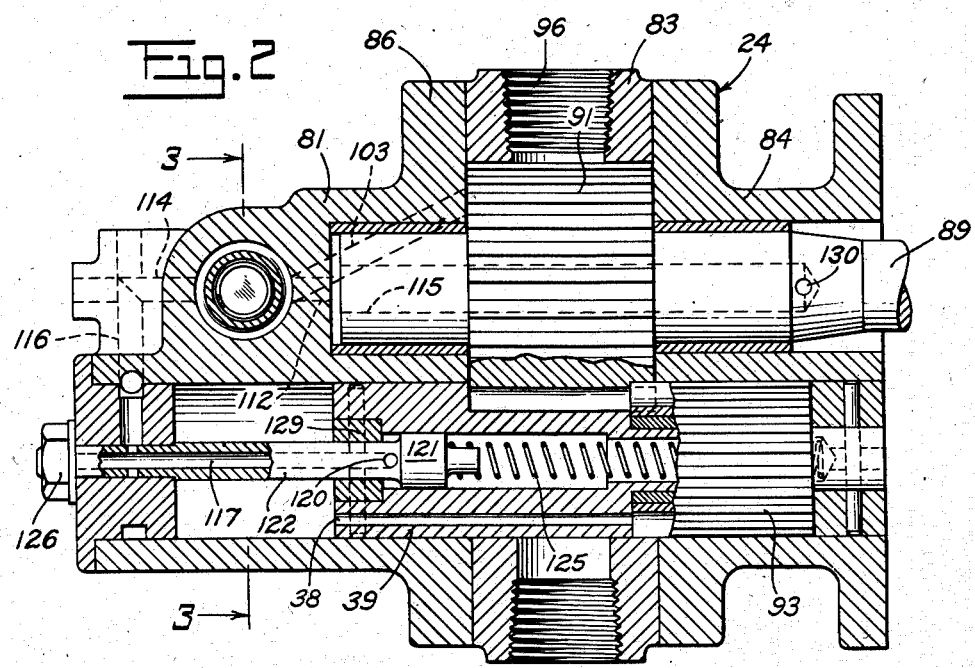
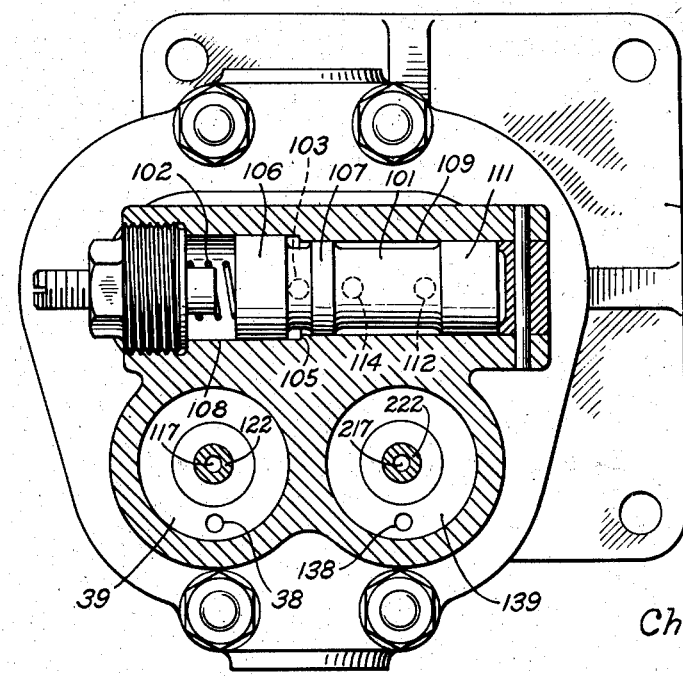
INVENTORS.
Charles I. MacNeil Patented Nov. 11, 1941

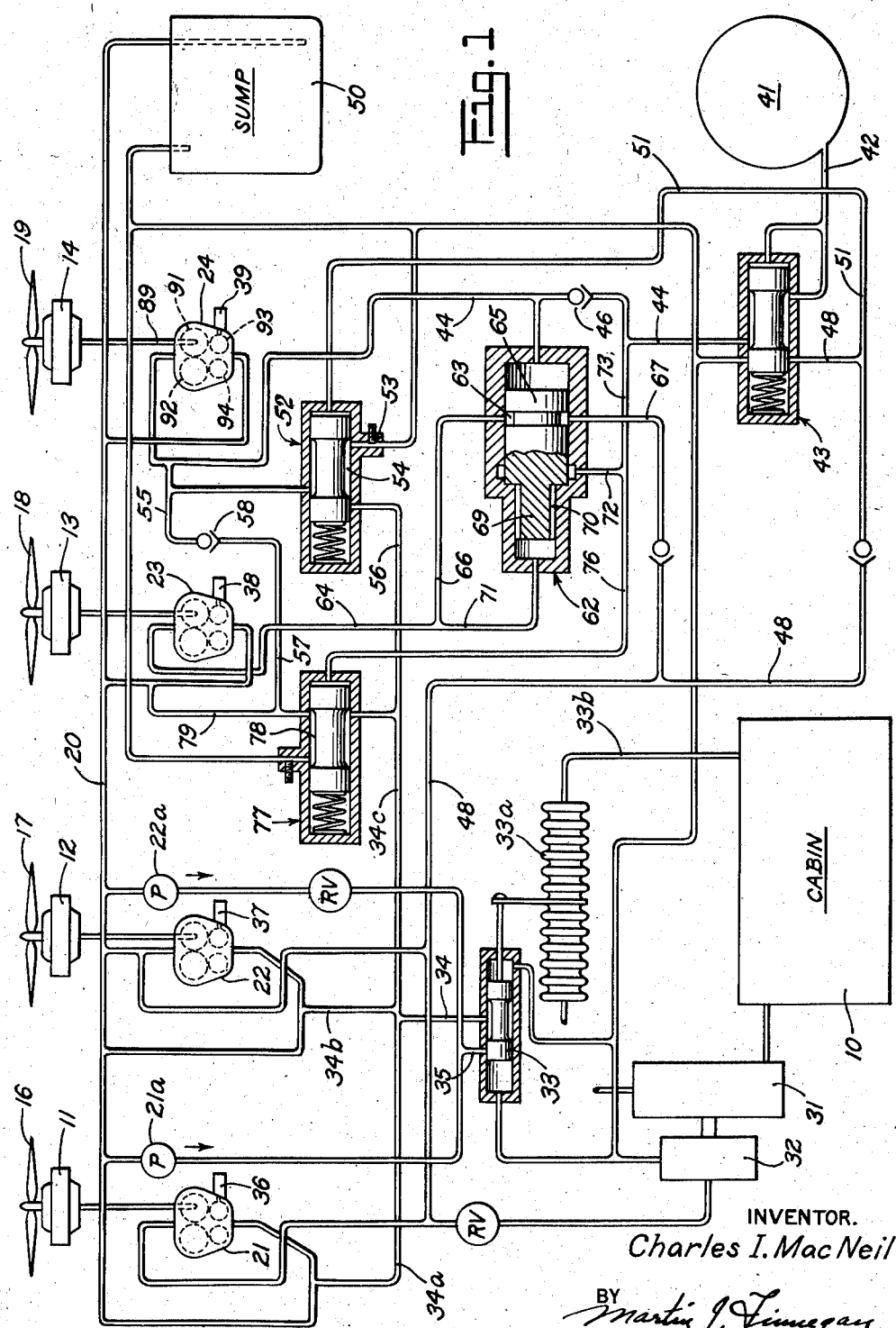

2,262,331

UNITED STATES PATENT OFFICE 2,262,331

FLUID PRESSURE SYSTEM

Charles L. MacNeil, Glen Ridge, N. J., assignor to Bendix Aviation Corporation, South Bend, Ind., a corporation of Delaware Application December 5, 1940, Serial No. 368,721

1 Claim. (Cl. 103—120)

This invention relates to fluid pressure systems, and particularly to pumping mechanism for maintenance of an adequate supply of fluid under pressure throughout the period of operation of any system with which said pumping mechanism is employed.

In the drawings the invention is shown applied to the maintenance of proper air pressure within a sealed cabin or compartment of an aircraft; also to the maintenance of a supply of fluid pressure for operation of the air supplying means, as well as for operation of other fluid pressure responsive means performing various services incidental to the flight of an aircraft, as for example, pumps and fluid motors controlling the operation of airfoil surfaces, flight directional determining devices, flaps, brakes, doors, undercarriage assemblies, propeller pitch controls, and superchargers.

A system of the character indicated is preferably provided with interlocking means between the elements of the system which control the supply of breathable air to the aircraft cabin or compartment, in which the passengers and crew are confined on the one hand, and those elements of the system which control the performance of the various services heretofore mentioned, on the other; the effect being such as to assure equalization of loads and transfer of energy from any part of the system to any other part whenever such transfer is desirable for the maintenance of the predetermined pressure conditions.

An object of the invention is to provide pumping mechanism of such construction and characteristics as to facilitate attainment of the results just described.

Another object is to provide a pressure generating unit (pump) of a novel construction permitting automatic variation in the output volume, while continuing to operate at a speed greatly in excess of that heretofore employed in variable volume pumps.

These and other objects will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claim for this purpose.

In the drawings:

Fig. 1 is a schematic view indicating the preferred mode of applying the invention to a four-motored aircraft having a sealed cabin whose air content is to be varied as desired, and also including flight controls of diverse kinds, operable by fluid stored under pressure in an accumulator whose feed circuit is interlocked with the feed circuit of a fluid motor constituting the energizing means for the cabin air supplying pump (hereinafter referred to as a supercharger); the two feed circuits being subjected to common barometric control means in such manner as to insure smooth, uninterrupted and properly proportioned delivery of power to all work performing elements, regardless of disturbances or failures that may occur from time to time at one or more of the pressure generating sources.

(Thus the feed circuits constitute one major phase of the system, while the common barometric control means constitutes a complementary and co-ordinate phase of the system.)

Fig. 2 is a longitudinal sectional view of one of the pressure generating sources; such pressure generating source, as illustrated, being in the nature of a variable delivery pump of novel construction, driven directly from, and by, one of the four propeller driving motors of the craft; there being, in the preferred embodiment, one such variable delivery pump for each motor, and separate drives from each motor to the particular pump associated therewith.

Fig. 3 is a transverse sectional view along line 3—3 of Fig. 2.

In Fig. 1 the invention is shown applied to an aircraft having a sealed compartment 10, and suitable for sub-stratosphere flight under the propelling power of its four engines 11, 12, 13 and 14, adapted to drive propellers 16, 17, 18 and 19, respectively, and also provided with power take-offs to energize the pumps 21, 22, 23 and 24, respectively, constituting (with supplementary pumps 21a and 22a driven from engines 11 and 12, respectively) the pressure generating sources of the system. The internal construction of pump 24 is shown in Figs. 2 and 3, and the internal construction of each of the other three pumps 21, 22 and 23 is preferably identical with that of pump 24. The latter will be described more fully hereinafter.

The compartment 10, indicated diagrammatically, represents any suitable, and suitably located, part or parts of the fuselage, cabin, or the like, of dimensions properly to accommodate the intended number of occupants. It is sufficient to consider a single compartment, since if two or more are provided in one craft, they may be interconnected, or if separate, there may be a corresponding duplication of parts, etc., for each. Broadly, the compartment represents any part or all of the cabin or body of the craft which may be adapted to retain air at suitable pressure, for the purposes of the invention.

Considering the single compartment shown (which may be identified as a "pressure" compartment) it is intended to enclose and retain air at a pressure greater than outside pressure, from the lowest altitude at which reduced air-pressure tends to discomfort, injure or disable occupants of an aircraft, up to any practical maximum altitude. The compartment 10 has any desired structural features enabling it to retain the desired pressure, while serving other necessary purposes. It is, however, here remarked, that the pressure to be maintained within the compartment need never be, for present purposes, greater than 15 lbs. per sq. in., and there will always be an external, partially balancing pressure, which of course decreases with altitude. The internal pressure may in fact, in many cases, be somewhat less than 15 lbs. without serious discomfort.

For supplying and/or maintaining air at a desired pressure in the compartment, in the preferred embodiment of the invention, a pump or compressor 31 is provided; the said pump 31 (hereinafter referred to as the "supercharger") being mechanically driven by a fluid motor 32 to which fluid under pressure is supplied at such rates and pressures as are determined by the action of the barometric control unit 33 and the circuit 34 associated therewith. This circuit 34, as indicated particularly at 34a and 34b, feeds directly to pumps 21 and 22 and acts through servo-motors 36 and 37 (associated with pumps 21 and 22, respectively) to control the output of said pumps; and said circuit 34, also acts, indirectly, upon the other two pumps 23 and 24, as will be further explained.

The manner in which servo-motors 36, 37, 38 and 39 control the output of the associated pumps 21, 22, 23 and 24, respectively, will be explained by referring to Figs. 2 and 3, wherein the pump 24 (typical of pumps 21 to 24, inclusive) is shown sectioned along intersecting planes. Pump 24 is represented in these views as having a series of abutting casing sections, including a head section 81, a base 82, (omitted in Fig. 2) and intermediate sections 83 and 84, the section 83 being the gear containing section, and being abutted on the top by flange 86 of head section 81; while section 84 is abutted on the bottom by the base 82. Through these sections extends the engine driven actuating shaft 89 carrying pump gear 91 which meshes with gear 92 (not shown in Fig. 2, but see Fig. 1) to produce the pumping action. A set of idler gears 93, 94 mesh with gears 91, 92, respectively, on the suction side of the pump, and are adapted to slide, from time to time, along the tooth faces, thus varying the extent of inter-engagement therebetween and thereby altering the volume of pumping space and hence the output at delivery port 96.

The means for controlling the sliding of idler gears 93, 94 along the faces of the teeth of gears 91, 92, respectively, is shown as including a three-way slide valve 101 with a hydraulically unbalanced plunger, hollow-bored to accept a compensating spring 102. A port 103 normally connects the pressure side of the pump to the space between lands 106 and 107 of the valve 101, the land 106 being of slightly larger diameter than land 107, and operating in the slightly larger bore 108, while land 107 operates in the smaller bore 109. When the valve 101 is shifted to the left from the position indicated in Fig. 3 communication is established for delivery of fluid to a cylinder 39, the delivery being from the supply passage 103 to the annular chamber in bore 109 between the lands 107 and 111, and from said chamber to the cylinder 39 by way of the intervening passages 114, 116 and 117, as shown in Fig. 2, the longitudinal passage 117 terminating in a radial port 120 which feeds into the annular space between the piston rod 122 of the piston 121 and the cylinder 39 in which said piston fits as shown in Fig. 2; the piston 121, with its rod 122, being held stationary in the position to which it is adjusted by the adjusting means 126, and the cylinder 39 being slidable with respect to said piston 121 in response to the admission of fluid by way of the ports 117 and 120 above described, and such sliding of the piston 39 being yieldably opposed by the compression spring 125, one end of which abuts the piston 121 and the opposite end of which is seated in the end of the bore of the assembly which includes the cylinder 39 and the idler gear 93 previously described; it being understood that there is a second cylinder (139) corresponding to the cylinder 39 and having the idler gear 94 integral therewith, a second passage (217) corresponding to the passage 117; and a second piston rod (222) corresponding to the piston rod 122. Passages 38 and 138 relieve the spaces to the left of cylinders 39 and 139, respectively, of any vacuum caused therein by movement of said cylinders in their respective bores.

When fluid is admitted to the cylinder 39 the pressure thereof against the portion 129 of said cylinder causes the assembly 39, 93 to move to the left as viewed in Fig. 2, thereby moving the gear 93 into a condition of more complete engagement with the teeth of the pumping gear 91. This correspondingly decreases the volume of fluid delivery and hence decreases the pumping action. The resulting decrease in pressure at the discharge passage 96 of the pump causes a corresponding pressure decrease in the port 103, and this decreased pressure acting against the land 107, is insufficient to balance the opposite action of the spring 102. The latter therefore returns the valve 101 to the right, that is, back to the position indicated in Fig. 3, thereby re-establishing communication between the passages 117, 116 and 114 on the one hand, and the discharge passage 112 on the other; said passage 112 being located between the lands 107 and 111 of the valve 101 as shown in Fig. 3. As shown in Fig. 2, this discharge passage 112 communicates with the bore 115 of the pump shaft 89 and from passage 115 there is a port 130 by which the fluid is allowed to drain back to the suction side of the pump, and thence to a suitable reservoir which may be the sump indicated at 50 in Fig. 1. The resulting loss of fluid from the cylinder 39 allows spring 125 to expand, thereby shifting the cylinder 39 to the right again and tending to restore it to the position indicated in Fig. 2, in which position the pumping action is increased by reason of the sliding of the gear 93 toward a position of minimum inter-engagement with the teeth of the gear 91. This cycle of action thus varies the pump delivery rate in accordance with output pressure, and tends to reduce the delivery toward the zero point whenever the pump delivery is being transferred from one outlet to another in the manner hereinafter described.

Referring again to Fig. 1, the accumulator 41, adapted to supply fluid under pressure, as needed, for actuation of the various flight control units of the craft, is fed by a supply line 42 leading thereto from control valve 43, the latter being supplied with fluid directly from pump 24, by way of line 44, in which is preferably included a check, or non-return, valve 46. Control valve 43 is so constructed that when the accumulator 41 receives its full charge—say, 1400 lbs. per sq. in.—the flow from pump 24 is shunted into the feed line 48 leading to the fluid motor 32; but just before this shunting occurs, the pressure rise in line 44—that is, at the delivery side 96 of pump 24—operates to reduce the output of this pump 24 to a point approaching zero; the manner in which this output reduction is effected having been described above with particular reference to Figs. 2 and 3 wherein the operating parts of said pump 24 are shown in detail. As a consequence of this reduction in output prior to transfer to circuit 48, there is an absence of sudden shock upon the system, and the absorption of the additional pressure source for circuit 48 is allowed to proceed gradually, so that there is a smooth "leveling" action as between all four pumps, all of which have delivery lines capable of feeding the line 48 supplying the fluid motor 32.

In addition to feeding the line 48, pump 24 simultaneously becomes interlocked with the other pump as a feeding means for the barometric control circuit 34, 35. This interlocking of pump 24 with the other three pumps (the latter being operative upon the barometric control circuit theretofore) is brought about by reason of the shunt circuit 51 from motor feed circuit 48 to a two-way valve 52 with a flow restriction orifice 53 and an annular chamber 54 shiftable to connect barometric control circuit lead 56 to conduit 55 and thus to the discharge pipe 57 passing from pump 24 to pump 23 and including a non-return valve 58.

As previously noted, pump 23, like pumps 21, 22 and 24, has a two-stage servo-motor 38 associated therewith; it being understood that the servo-motors shown diagrammatically at 36, 37, 38 and 39 in Fig. 1 are actually built into the pumps 21, 22, 23 and 24, respectively, and have an actual appearance corresponding to that shown at 39 (pump 24) in Figs. 2 and 3, and heretofore described in detail.

Pump 23 also has communication with a bypass valve 62, and the normal path of flow therethrough is by way of annular chamber 63 which normally connects line 64, 66 with the line 67 leading to the fluid motor feed line 48; but whenever pump 24 ceases to function, the pressure from pump 23 exerted against the smaller piston 69 (by way of lines 64 and 71) exceeds the pressure acting oppositely upon the larger piston 65 and thereby shuts off flow through chamber 63 and diverts the flow to the accumulator control valve 43 and thence to the accumulator, the new path being by way of leads 64, 71, longitudinal grooves 70, passages 72, 73, 44 and 42. Included in said new path is a tap-off 76 leading to one end of a two-way valve 77 (similar to valve 52) and the pressure thus exerted on said valve 77 operates to interrupt the flow previously maintained through annular chamber 78 of said valve, as the connecting link between barometric control lines 34 and 34c, on the one hand, and line 79 of pump 23 on the other.

The flow from pump 23 to accumulator 41, by the circuit above traced, continues until such time as the predetermined maximum pressure is attained, whereupon the two-stage servo-motor 38 reduces the pump 23 delivery to nearly zero, and the line 66, 67 is thereby re-opened, thus augmenting the supply to supercharger driving motor 32; the action of servo-motor 38 being such as to permit the gradual leveling of the load, as heretofore explained in connection with the description of the operation of servo-motor 39 of pump 24.

Thus there is an alternate cutting in and out of this additional pressure source and a consequent control of the fluid supply not only to the feed lines 48 for the supercharger motor 32 but also to the barometrically controlled circuits 34a, 34b and 34c supplementing the supply from source 50 to the pumps 21, 22 and 23; such control action being in turn influenced by the concurrently effective barometric control constituted by the shiftable valve 33 which responds to every change in the pressure differential between the pressure within the cabin 10 on the one hand, and the external atmospheric pressure on the other; it being understood that the lefthand side of the barometric unit 33a is open to the atmospheric outside cabin 10 while the righthand end of unit 33a reflects the pressure within the cabin 10 due to the connection indicated at 33b.

The supplementary pressure generators 21a and 22a are desirable as a means of assuring delivery of fluid to the unit 33 from the source 50 regardless of the positions of the gears of the pumps 21 to 24 which are controlled by the movements of the servo-motors 36 to 39, respectively, wherefore there is assurance that unit 33 will always receive a sufficient supply of fluid to take care of all requirements, as for example, a suddenly imposed need for additional pressure within the cabin 10 and a consequent maximum demand upon the supercharger driving motor 32.

Referring back to the matter of the construction of the pumps 21 to 24, inclusive, of which the pump 24 as shown in section in Figs. 2 and 3 is representative, it will be noted that the only gears which move axially are the idler gears 93 and 94. The actual working gears 91 and 92 (with which the idler gears 93 and 94, respectively, mesh) have permanently fixed axial positions, in that they completely fill the space between the confining elements 84 and 86 (Fig. 2). Thus the working faces of the pump are of constant area, although the actual volume of the pumping space varies in accordance with the axial shifting of the idler gears 93 and 94. This mode of controlling the output differs from that of certain prior art constructions wherein the actual area of the engaging surfaces of the working gears is caused to vary as the means of reducing or increasing the pumping action in accordance with pressure variations. By resorting to the use of idler gears and causing said idler gears to shift their positions in relation to the working gears I achieve results equivalent to those of the prior art but without the necessity of shifting the relative axial positions of the working (pumping) gears themselves.

What is claimed is:

In a pump having a pair of working gears and a pair of idler gears, there being one idler gear in partial mesh with each working gear when the developed pressure is low, means for holding said working gears in fully meshed relationship, one to the other, at all pressures developed by the pump, an inlet port to direct fluid into the space between said two working gears, an outlet port to receive the fluid delivered thereto by the rotation of said working gears, means for rotating said working gears and thereby creating a pressure at said outlet port, and means responsive to an increase in such pressure to move said idler gears into a condition of more complete mesh with their respective working gears engaged therewith, wherefore the free space remaining for fluid flow through the pump is diminished, and the delivery volume per revolution of said gears is correspondingly reduced.

CHARLES I. MacNEIL.